June 20, 1944. I. SHORT ET AL 2,352,130
LUBRICATION APPARATUS
Filed July 30, 1940
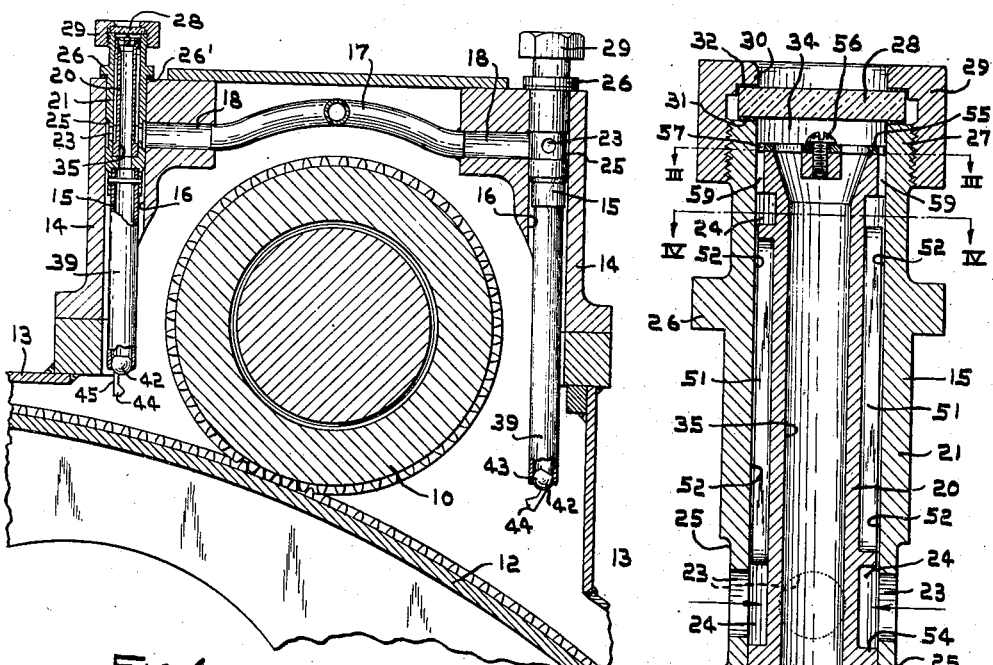
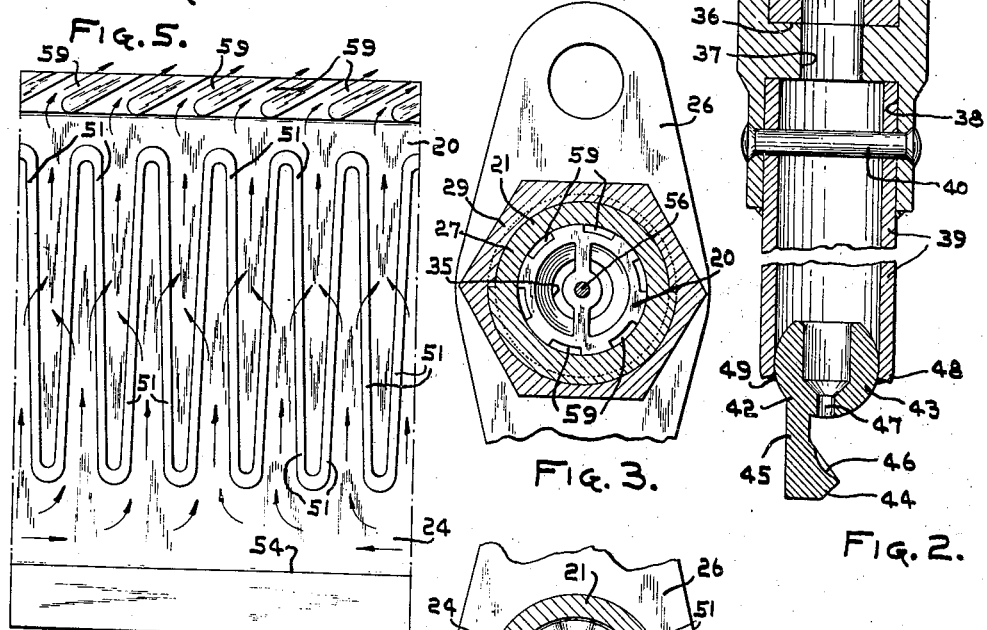
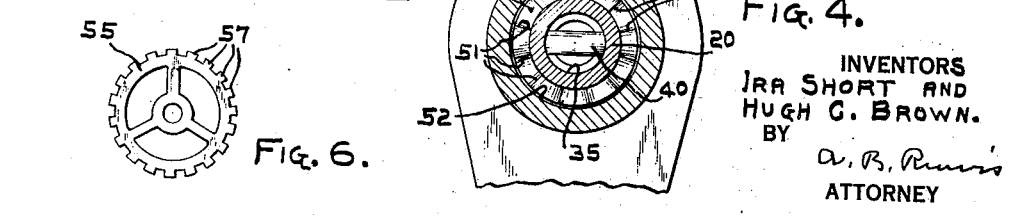
INVENTORS
IRA SHORT AND
HUGH G. BROWN.
BY
ATTORNEY

UNITED STATES PATENT OFFICE 2,352,130

LUBRICATION APPARATUS

Ira Short, Prospect Park, and Hugh C. Brown, Philadelphia, Pa., assignors to Westinghouse Electric & Manufacturing Company, East Pittsburgh, Pa., a corporation of Pennsylvania Application July 30, 1940, Serial No. 348,370

2 Claims. (Cl. 210—169)

The invention relates to lubrication systems, more particularly to oil spray assemblies, and has for an object the provision of a novel structure of this nature.

A further object of the invention is the provision of an oil spray assembly including a filter or strainer.

Another object of the invention is the provision of an oil spray assembly including visible means for indicating flow of oil therethrough.

These and other objects are effected by the invention as will be apparent from the following description and claims taken in connection with the accompanying drawing forming a part of this application, in which:

Fig. 1 is a fragmentary sectional view of an intermeshing pinion and gear having applied thereto the novel oil spray assembly;

Fig. 2 is an enlarged vertical sectional view of the oil spray assembly;

Figs. 3 and 4 are transverse sectional views, taken along the lines III—III and IV—IV, respectively, of Fig. 2;

Fig. 5 is a developed view of the inner tubular member of the oil spray assembly; and, Fig. 6 is a plan view of the spinner.

With the use of reduction gearing, particularly of the type used in marine propulsion, it is highly desirable, if not absolutely necessary, to subject the meshing zone of the pinion and/or gear teeth to a spray of lubricating medium, preferably oil.

In order to perform this lubrication, we have provided the oil spray assembly hereinafter described.

Referring now to the drawing more in detail, there is shown, in Fig. 1, a pinion 10 meshing with the gear 12, both the pinion and gear being enclosed by a housing comprised by a gear-enclosing portion 13 and a pinion-enclosing portion 14.

Oil is applied to the pinion teeth at or near their meshing zone by one or more spray assemblies 15, mounted in openings 16 extending through the wall of the housing portion 14. Oil is supplied to each spray assembly 15 through the conduit 17 and passages 18 from any suitable source of supply and by any suitable means, such as an oil sump or reservoir and a pump (not shown).

Referring now to Fig. 2, each spray assembly is comprised by an inner tubular member 20 and an outer tubular member 21 concentrically disposed and spaced slightly apart. The outer member is provided with a plurality of oil inlets 23 spaced a substantial distance from the upper or outer end of the assembly and providing for admission of oil to the space 24 between the inner and outer members. A circumferential groove 25 in the outer surface of the outer member 21 communicating with the inlet openings 23, provides equal distribution of oil from the conduits 17 and passages 18 to all of the openings 23.

The outer tubular member 21 is provided with an external shoulder or flange 26 so positioned axially thereof as to provide for alignment of the circumferential recess 25 with the passage 18 when said shoulder or flange abuts the upper or outer surface of the housing 14. A gasket 26' may be provided beneath the shoulder 26 to prevent leakage of oil.

The upper or outer end of the tubular member 21 extends axially beyond the corresponding end of the inner tubular member 20 and is closed by a member 28, preferably of glass or some transparent material, for a purpose to be hereinafter described. The closure member 28 is held in sealing relation to the end of the tubular member 21 by a nut 29 having an inwardly-projecting flange or shoulder 30 disposed in opposed relation to the annular end surface of the tubular member. A fluid-tight seal between the closure member 28 and the tubular member 21 is maintained by gaskets 31 and 32 disposed at the inner and outer sides, respectively, of the closure member. Inasmuch as this closure member is preferably of glass, the gaskets 31 and 32 perform a double function, that is, they not only provide a fluid-tight seal but also serve as cushioning means for the glass closure member, thereby preventing danger of cracking or breaking of the latter upon tightening of the nut 29.

It will be seen that the extending end portion 27 of the outer tubular member, together with the closure member 28, provides a chamber 34, hereinafter referred to as a reversing chamber inasmuch as oil flowing from the inlet 23 through the space 24 has its direction of flow reversed in said chamber 34 for return through the axial bore 35 of the inner tubular member.

The inner tubular member is supported by an inwardly-directed radial flange 36 on the outer tubular member 21, so dimensioned as to provide the internal bore 37, of a diameter corresponding to the bore 35 of the inner tubular member 20, whereby uninterrupted flow of oil therethrough may occur.

The lower or inner end of the outer tubular member 21 is provided with an enlarged internal bore 38 for the reception of the tubular extension member 39, secured therein in any suitable manner, as by the rivet 40.

A spray head 42 is mounted at the lower or innermost end of the extension tube 39 and is comprised by a spherical body portion 43 and a fluid-directing head portion 44 connected thereto by a neck 45. Preferably, a concave fluid-directing surface 46 is provided on the head in such a location as to be contacted by the stream of oil leaving the assembly through the opening 47 in the body portion 43 of the spray head 42. By forming this spray-contacting surface as a concavity, the sheet or spray of oil leaving the surface will be in the form of a flat fan-like sheet, which is preferable for the lubrication of intermeshing gear teeth.

The lowermost end of the tubular member 39 is slightly closed as at 48 to provide, in effect, a ball-and-socket joint between said tubular end and the spherical body portion of the spray head. This construction provides for angular adjustment of the spray head to whatever position may be necessary, after which said spray head is held in the desired position by the application of silver solder, or other suitable material, to the end of the tubular member 39, as at 49.

Where the oil passing through the spray assembly is used for lubricating meshing teeth of gears, as herein illustrated, it is necessary that such oil be thoroughly strained or filtered to remove all particles of solid matter which might otherwise injure the working faces of the gear teeth or would close the spray nozzle 47. To this end, there is provided in the space 24 between the inner and outer tubular members 20 and 21, respectively, a filter or strainer comprised by longitudinal ribs 51 formed integral with the outer surface of the inner tubular member 20 and extending radially outward from such surface toward and adjacent to the inner surface of the outer tubular member 21 so as to provide therebetween a relatively narrow space 52 for passage of oil. Each of the longitudinally-extending ribs 51 is connected at one end with one of the adjacent ribs and at its other end with the outer adjacent rib, whereby a continuous snakelike convolution is provided (Fig. 5). Thus, oil entering the assembly at 23 is forced to flow over the edges of the ribs 51 through the narrow space 52 in order to reach the reversing chamber 34 and the internal axial bore 35 of the inner tubular member. Upon withdrawal of the inner member 20 from the outer member 21, the flange 54 at the inner end of the former fitting close to the bore of the latter, serves to remove all dirt caught in the strainer.

It is highly desirable in apparatus of this nature, used under these conditions, that means be provided for indicating any interruption to the normal flow of lubricating oil. To this end, there is provided within the reversing chamber 34 a spinner 55, rotatably mounted in any suitable manner, as by the screw 56, and provided at its periphery with blades or vanes 57 adapted to be contacted by the oil flowing therepast. In order to assure positive rotation of the spinner 55, nozzles 59 are provided in the outer or upper end of the inner tubular member 20, these nozzles being angularly disposed, as indicated in Fig. 5, whereby oil flowing therethrough and leaving the same contacts the vanes 57 of the spinner 55 in such a manner as to impart rotation to the latter. As clearly shown in Fig. 2, the spinner is located in close proximity to the transparent closure member 28, through which an attendant may easily observe the rotation of the spinner. Obviously, if the spray nozzle 47 or filter or strainer 51 becomes clogged, thereby interrupting the flow of oil through the apparatus, this fact will be indicated to the attendant by the resulting stoppage of rotation of the spinner 55.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. A liquid filter comprising concentrically-disposed inner and outer tubular members, one end of the outer member extending beyond the corresponding end of the inner member; a closure member for said one end of the outer member which cooperates with the corresponding end of the inner member to define a chamber, said inner member having an outside diameter materially less than the inside diameter of the outer member, whereby an annular space is provided between said members for flow of liquid, said space communicating at one end with the chamber; means providing an inlet to the other end of said annular space, the hollow bore of the inner member being in communication at one end with the chamber and being open at the other end to define an outlet from said chamber; and a plurality of longitudinal ribs on one of said tubular members extending radially into said space, the tops of said ribs being spaced slightly from the other of said tubular members and each rib being connected at one end with one adjacent rib and at its other end with the other adjacent rib to provide a continuous convoluted structure over which liquid is forced to flow in traversing said space from the inlet to the chamber.

2. Structure as specified in claim 1, wherein the closure member is transparent, said structure including a spinner rotatably mounted within the chamber, and a plurality of nozzles having their inlets in communication with the annular space and their outlets directed at the spinner for directing the liquid flowing through said chamber against said spinner to cause it to rotate, said spinner being located near the transparent closure member, whereby rotation of said spinner due to flow of liquid through the chamber may be observed.

IRA SHORT.
HUGH C. BROWN.